Sept. 12, 1950  K. B. RADEWALD  2,521,872
REFLECTING MULTIPLE SIGHT LINE
ORIENTATION INSTRUMENT
Filed June 23, 1948
Fig. 1.
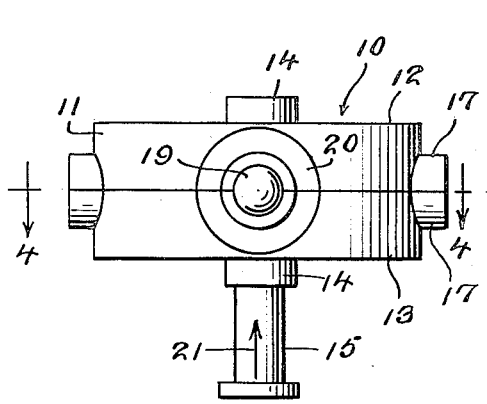
Fig. 2.
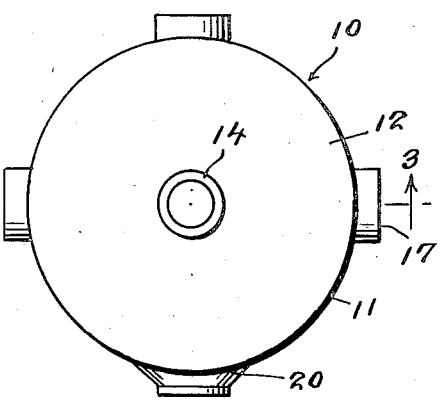
Fig. 3.
Fig. 4.
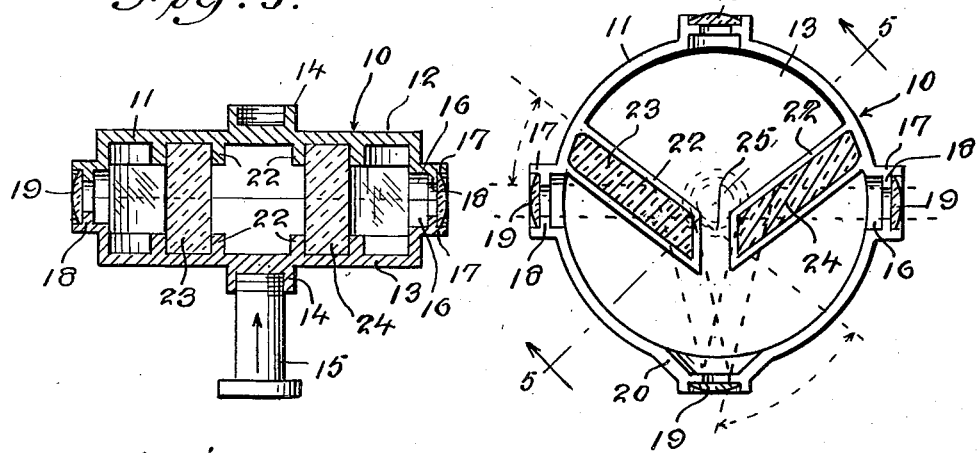
Fig. 5.
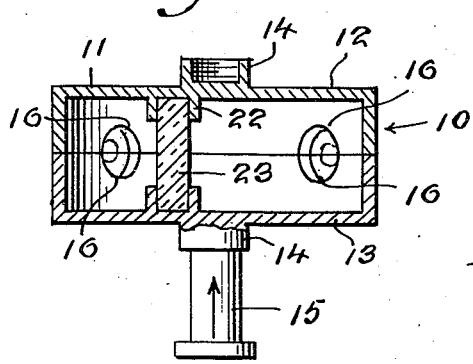
INVENTOR.
Karl B. Radewald
BY Victor J. Evans & Co.
ATTORNEYS Patented Sept. 12, 1950

2,521,872

UNITED STATES PATENT OFFICE 2,521,872

REFLECTING MULTIPLE SIGHT LINE ORIENTATION INSTRUMENT

Karl B. Radewald, Niles, Mich.

Application June 23, 1948, Serial No. 34,740

1 Claim. (Cl. 88—2.6)

This invention relates to instruments and more particularly to an orientation instrument that is used to locate a positive location or point.

An object of the invention is to provide an orientation instrument that is small, easily carried in a garment pocket, yet will provide accurate and precise calculations.

Other objects of the invention are to provide an instrument that will save time in orienting the user thereof, reduces a complex calculation down to a simple operation, can be used in places where a transit would be useless, can be inexpensively produced and has a multiplicity of uses.

With the above and other objects and advantages in view, the invention consists of the novel details of construction, arrangement and combination of parts more fully hereinafter described, claimed and illustrated in the accompanying drawing in which:

Figure 1 is an elevational view of an embodiment of the invention looking at the view aperture;

Figure 2 is a top plan view of the instrument;

Figure 3 is a sectional view on the line 3—3 of Figure 2;

Figure 4 is a sectional view on the line 4—4 of Figure 1 and

Figure 5 is a sectional view on the line 5—5 of Figure 4.

Referring more in detail to the drawing, the instrument embodying the invention is generally designated by the reference numeral 10.

The instrument 10 comprises a circular hollow body 11 which is split transversely to form the sections 12 and 13 respectively.

The bottom and top of the body form plane surfaces and centrally of each there is formed a tapped boss 14 which is adapted to removably receive the handle 15. However if so desired the handle can be fixed permanently on the boss 14.

Each section is grooved with four radially disposed half openings 16 which, when in position, provide full openings. The openings are disposed so that each pair of openings is in alinement with each other, and opposed to each other. Each half opening has an outwardly directed half flange 17 which is provided on its inner surface with the inwardly directed semi-annular flange 18. Positioned in each of the complete flanges formed by the half flanges 17 is a lens 19 and the lens is retained in place by any well known securing means.

To indicate the sight or eye opening before the lens 19 to which the eye of the user is to be applied and to correlate the angles of incidence with regard to the lens 19, a conical shaped enlargement 20 is formed in the wall of the body, as shown in Figure 4. To further indicate the sight or eye opening, an arrow 21 is placed on the handle 15 so that it is easy to select the right opening.

Arranged at an angle to the conical enlargement 20, are the angularly disposed upstanding retaining flanges 22, which retain therein the prisms 23 and 24 respectively. Therefore the angle of reflection and the angle of incidence are so arranged that all the images are in the line of vision of the sight or eye opening in front of the lens 19.

The instrument thus constructed comprises a body having two reflecting surfaces and lenses, arranged radially to the reflecting surfaces. The principle of the invention, therefore, involves two or more lines crossing at a common point to give a positive location to that point provided that the lines are definitely located. This instrument positively locating each line with respect to some fixed object will thus determine the point positively.

In this instrument, there will be two reflecting images seen through the lens 19 to the right and left of the eye lens, and a clear vision of an object through the space 25 intermediate of the forward edges of the prisms 23 and 24.

There will be given, therefore, the intersection of two lines, as shown in Figure 4, at the center of the instrument, which will be a positive location of the point with respect to the fixed objects which determine the lines.

In use, therefore, when the user of the instrument desires to locate the point at which he is standing, he places his eye at the sight or eye opening and rotates the instrument around its vertical axis until he has picked up three fixed points—two reflected and one direct. Then a mental or written note is made of these points. To relocate the point at which he was standing, the user of the instrument merely comes back and brings the three fixed points back into the eye piece in the exact position first noted, and the point is exactly relocated. For an example of the operation of the instrument, suppose the user has been standing at A, and has located fixed points B, C and D. Should the user of the instrument desire to relocate the point A first found, and is not at the exact point, but at a position X, he rotates the instrument to locate two of the points he has already noted. Suppose he locates the points C and D, but not the point B. It will be possible to pick up the point B by rotating the instrument in a clockwise direction about its vertical axis, but this rotation will lose points C and D. This will indicate that by swinging in an arc with the instrument and a straight line as a radius from the point X, the user should be able to bring back points D, B and C simultaneously into the eye piece on this arc, thereby relocating the original point A.

The easiest and quickest way to use the instrument is to locate the three fixed points ahead of the user, then to move forward on the center point C fixed in the instrument until one of the other points B or D is picked up, then by readjusting his position, the user can pick up the three points B, C and D in the exact position first noted, and the point A is relocated. Thus the first point is located integral to the other points that were noted in the first instance.

Three images may be used, as described, or any number may be used, so that the intensity of lines can be as many as the radii radiating from the center of a sphere to the surface. Instead of a single lens and opening, a continuous lens having a continuous window, can be used in the body. Movable positions can be used on the outside to positively locate the lines.

The lens can be used to magnify, to increase the distance seen by the user.

If attached to a tripod, a plumb body may be attached to the handle 15. The lens may be made movable so that various angles can be used in determining the point to be located. Various changes in the location of the eye piece from horizontal to vertical may be made.

The instrument can be used to locate points on water, in the air or on land, and the adaptability of the instrument to various uses is unlimited.

It is believed that from the foregoing description, the construction and manner of use of the instrument will be apparent to those skilled in the art, and it is to be understood that minor changes in the arrangement, construction and combination of the various parts may be resorted to, provided they fall within the spirit of the invention and the scope of the appended claim.

Having thus described the invention, what is claimed as new and desired to be secured by Letters Patent is:

An orientation instrument comprising a hollow flat sided circular sectional body, a tapped boss on the exterior surface of each section centrally thereof to selectively receive a handle on either section, openings formed in the circular wall of said body in diametrical opposed relation to each other with the axis of said openings lying in planes at right angles to each other, and one of said openings forming an eye piece for said body and the opening in direct alinement with said eye piece being a direct sight opening, lenses in said openings, retaining flanges in said openings to retain the lenses in said openings, reflecting means positioned in said body at an angle to said eye piece so that said reflecting means bisects the axis of the openings arranged at right angles to said eye piece and said sight opening whereby the images reflected by said reflecting means are reviewed through said eye piece coincidental with an image on a direct line of vision through said eye piece and said sight opening and upstanding retaining flanges in each section of said body to retain said reflecting means in said body.

KARL B. RADEWALD.

REFERENCES CITED

The following references are of record in the file of this patent:

UNITED STATES PATENTS

| Number | Name | Date |
|---|---|---|
| 1,025,911 | Gasser | May 7, 1912 |
| 1,788,830 | Grone | Jan. 13, 1931 |
| 2,335,066 | Lamar | Nov. 23, 1943 |

FOREIGN PATENTS

| Number | Country | Date |
|---|---|---|
| 50,383 | Switzerland | Aug. 13, 1909 |
| 171,028 | Great Britain | Nov. 10, 1921 |